US010439801B2

(12) United States Patent
Hu et al.

(10) Patent No.: US 10,439,801 B2
(45) Date of Patent: Oct. 8, 2019

(54) ENTITY AUTHENTICATION METHOD AND DEVICE BASED ON PRE-SHARED KEY (71) Applicant: China IWNCOMM Co., LTD., Xi'an, Shaanxi (CN)

(72) Inventors: Ya'nan Hu, Shaanxi (CN); Zhiqiang Du, Shaanxi (CN); Guoqiang Zhang, Shaanxi (CN); Qin Li, Shaanxi (CN)

(73) Assignee: China IWNCOMM Co., LTD., Xi'an, Shaanxi (CN)

( * ) Notice: Subject to any disclaimer, the term of this patent is extended or adjusted under 35 U.S.C. 154(b) by 173 days.

(21) Appl. No.: 15/510,006

(22) PCT Filed: Jun. 23, 2015

(86) PCT No.: PCT/CN2015/082041
§ 371 (c)(1),
(2) Date: Mar. 9, 2017

(87) PCT Pub. No.: WO2016/058404
PCT Pub. Date: Apr. 21, 2016

(65) Prior Publication Data
US 2017/0310475 A1 Oct. 26, 2017

(30) Foreign Application Priority Data
Oct. 17, 2014 (CN) .......................... 2014 1 0554547

(51) Int. Cl.
H04L 9/08 (2006.01)
H04L 9/06 (2006.01)
(Continued)

(52) U.S. Cl.
CPC .......... H04L 9/0816 (2013.01); H04L 9/0656 (2013.01); H04L 9/3273 (2013.01);
(Continued)

(58) Field of Classification Search
CPC ... H04L 9/0816; H04L 63/0869; H04L 63/08; H04L 9/0656; H04L 9/3273;
(Continued)

(56) References Cited

U.S. PATENT DOCUMENTS

2013/0212390 A1 8/2013 Du et al.

FOREIGN PATENT DOCUMENTS

| CN | 101242323 A | 8/2008 |
| CN | 101853369 A | 10/2010 |

(Continued)

OTHER PUBLICATIONS

International Search Report for Application No. PCT/CN2015/082041 dated Aug. 26, 2015.
(Continued)

Primary Examiner — Ashokkumar B Patel
Assistant Examiner — Quazi Farooqui
(74) Attorney, Agent, or Firm — Wolf, Greenfield & Sacks, P.C.

(57) ABSTRACT

An entity authentication method includes: an entity A generates and sends $N_A$ to an entity B; the entity B generates $N_B$ and $ZSEED_B$, computes a key MKA||KEIA and first encrypted authentication data $AuthEncData_B$, and sends the $N_B$||$N_A$||AuthEncData$_B$ to the entity A for verification; the entity A generates $ZSEED_A$, computes second encrypted authentication data $AuthEncData_A$, a shared key seed Z, a master key MK and a first message authentication identifier MacTag$_A$, and sends the $N_A$||$N_B$||AuthEncData$_A$||MacTag$_A$ to the entity B for verification; the entity B computes Z, MK and MacTag$_A$, compares the MacTag$_A$ with the received MacTag$_A$, and if the two are equal, considers that the entity A is valid; the entity B computes and sends a second message authentication identifier MacTag$_B$ to the entity A; and the entity A computes MacTag$_B$, compares the MacTag$_B$ (Continued)

with the received MacTag$_B$, and if the two are equal, considers that the entity B is valid.

20 Claims, 4 Drawing Sheets

(51) Int. Cl.
   *H04L 29/06* (2006.01)
   *H04W 12/04* (2009.01)
   *H04L 9/32* (2006.01)

(52) U.S. Cl.
   CPC .......... *H04L 63/08* (2013.01); *H04L 63/0869* (2013.01); *H04W 12/04* (2013.01); *H04L 63/0435* (2013.01); *H04L 63/06* (2013.01)

(58) Field of Classification Search
   CPC ....... H04L 63/0435; H04L 63/06; H04L 9/08; H04L 9/06; H04L 29/06; H04W 12/04
   USPC ........................................................ 713/169
   See application file for complete search history.

(56) References Cited

FOREIGN PATENT DOCUMENTS

| | | |
|---|---|---|
| CN | 102014386 A | 4/2011 |
| WO | WO 2009/139629 A1 | 9/2009 |

OTHER PUBLICATIONS

[No Author], Information technology—telecommunication and information exchange between systems—NFC security: Part 1 NFC-SEC NFCIP—1 security services and protocol. International Standard ISO/IEC. 2014;13157(1):19pgs.

ENTITY AUTHENTICATION METHOD AND DEVICE BASED ON PRE-SHARED KEY

This application is the national phase of International Patent Application No. PCT/CN2015/082041, titled "ENTITY AUTHENTICATION METHOD AND DEVICE BASED ON PRE-SHARED KEY", filed on Jun. 23, 2015, which claims priority to Chinese Patent Application No. 201410554547.6, titled "ENTITY AUTHENTICATION METHOD AND DEVICE BASED ON PRE-SHARED KEY", filed on Oct. 17, 2014 with the State Intellectual Property Office of People's Republic of China, both of which are incorporated herein by reference incorporated herein by reference in to the maximum extent allowable by law.

FIELD

The present disclosure relates to the technical field of network security, and in particular to an entity authentication method and an entity authentication device based on a pre-shared key.

BACKGROUND

A communication network, such as a local area network WLAN, a wireless sensor network WSN, near field communication NFC, radio frequency identification RFID and a personal area network WPAN, is susceptible to be attacked such as being forged, tapped and replayed during communication. Therefore, it needs to authenticate identities of both parties of the communication before communication, so as to ensure legality of the identities of the both parties of the communication. Presently, in a solution based on a cipher algorithm particularly a symmetric cipher algorithm, since identities of both parties are generally not confirmed during an authentication process, it can be only determined that the other party has a certain shared secret even if the identity authentication is successful while the true identity of the other party still cannot be determined actually, resulting in a certain potential security risk.

SUMMARY

In order to solve the above technical problems existing in the conventional technology, it is necessary to provide an entity authentication method and an entity authentication device based on a pre-shared key. An entity authentication method based on a pre-shared key is provided, which includes:

in an entity A and an entity B which share a pre-shared key PSK and know each other's identifiers $ID_A$ and $ID_B$, step 1) generating a random number $N_A$ and sending the random number $N_A$ to the entity B by the entity A;

step 2) after $N_A$ is received, generating a random $ZSEED_B$ functioning as a key seed and a random number $N_B$, calculating a key $MKA\|KEIA=KDF1(N_A,N_B,PSK,ID_A,ID_B)$, calculating first encryption authentication data $AuthEncData_B=AuthEnc_{KEIA}(AAD, IV, N_B\|N_A\|ID_B\|ID_A\|ZSEED_B)$, and sending $N_B\|N_A\|AuthEncData_B$ to the entity A by the entity B, where MKA is an authentication key, KEIA is a message encryption and integrity key, KDF1 is a key derivation algorithm, $ID_A$ is an identifier of the entity A, $ID_B$ is an identifier of the entity B, AuthEnc is an encryption authentication algorithm, AAD is other authentication data required by the encryption authentication algorithm, and IV is an initial vector;

step 3) performing decryption and verification on $N_B\|N_A\|AuthEncData_B$ by the entity A after $N_B\|N_A\|AuthEncData_B$ is received;

step 4) generating a random number $ZSEED_A$ functioning as a key seed, calculating second encryption authentication data $AuthEncData_A=AuthEnc_{KEIA}(AAD, IV, N_A\|N_B\|ID_A\|ID_B\|ZSEED_A)$, calculating a shared key seed $Z=ZSEED_A \oplus ZSEED_B$, calculating a master key $MK=KDF2(N_A,N_B,Z,ID_A,ID_B)$, calculating a first message authentication identifier $MacTag_A=MAC(MK, MsgID1\|ID_A\|ID_B\|N_A\|N_B)$, and sending $N_A\|N_B\|AuthEncData_A\|MacTag_A$ to the entity B by the entity A, where MsgID1 is a message serial number, "$\oplus$" indicates bitwise exclusive-OR, KDF2 is a key derivation algorithm, and MAC is a message authentication code generation algorithm;

step 5) performing decryption and verification on $N_A\|N_B\|AuthEncData_A\|MacTag_A$ by the entity B after $N_A\|N_B\|AuthEncData_A\|MacTag_A$ is received;

step 6) calculating a shared key seed $Z=ZSEED_A \oplus ZSEED_B$, calculating a master key $MK=KDF2(N_A,N_B,Z,ID_A,ID_B)$, calculating a first message authentication identifier $MacTag_A=MAC(MK, MsgID1\|ID_A\|ID_B\|N_A\|N_B)$ and comparing the calculated $MacTag_A$ with the received $MacTag_A$ by the entity B; and determining that an identity of the entity A is valid by the entity B if the calculated $MacTag_A$ is equal to the received $MacTag_A$;

step 7) calculating a second message authentication identifier $MacTag_B=MAC(MK, MsgID2\|ID_B\|ID_A\|N_B\|N_A)$ and sending MacTagB to the entity A by the entity B, where MagID2 is a message serial number; and step 8) after the $MacTag_B$ is received, calculating a second message authentication identifier $MacTag_B=MAC(MK, MsgID2\|ID_B\|ID_A\|N_B\|N_A)$ and comparing the calculated $MacTag_B$ with the received $MacTag_B$ by the entity A; and determining that an identity of the entity B is valid by the entity A if the calculated $MacTag_B$ is equal to the received $MacTag_B$.

A device for performing identity authentication with another device is provided, the device including a storing unit, a processing unit and a transceiver unit, where the storing unit is configured to store a pre-shared key PSK with the another device and an identifier $ID_B$ of the another device; the transceiver unit is configured to send a random number $N_A$ to the another device and receive $N_B\|N_A\|AuthEncData_B$ sent by the another device;

the transceiver unit is further configured to send $N_A\|N_B\|AuthEncData_A\|MacTag_A$ to the another device and receive a second message authentication identifier $MacTag_B$ sent by the another device;

the processing unit is configured to generate the random number $N_A$;

the processing unit is further configured to perform decryption and verification on $N_B\|N_A\|AuthEncData_B$ sent by the another device;

the processing unit is further configured to generate a random number $ZSEED_A$ functioning as a key seed, calculate second encryption authentication data $AuthEncData_A=EncData_A\|MAC_A=AuthEnc_{KEIA}(AAD, IV, N_A\|N_B\|ID_A\|ID_B\|ZSEED_A)$, calculate a shared key seed $Z=ZSEED_A \oplus ZSEED_B$, calculate a master key $MK=KDF2(N_A,N_B,Z,ID_A,ID_B)$, calculate a first message authentication identifier $MacTag_A=MAC(MK, MsgID1\|ID_A\|ID_B\|N_A\|N_B)$, and generate $N_A\|N_B\|AuthEncData_A\|MacTag_A$, where AuthEnc is an encryption authentication algorithm, $EncData_A$ is encryption data generated by the device, $MAC_A$ is an integrity authentication code generated by the device, AAD is other authentication data required by the encryption authentication algorithm, IV is an initial vector, $ID_A$ is an identifier of the device, $ID_B$ is an identifier of the another device, KDF2 is a key derivation algorithm, MsgID1 is a message serial number, MAC is a message authentication code generation algorithm, and "$\oplus$" indicates bitwise exclusive-OR; and the processing unit is further configured to calculate a second message authentication identifier $MacTag_B=MAC(MK, MsgID2\|ID_B\|ID_A\|N_B\|N_A)$; compare the calculated $MacTag_B$ with $MacTag_B$ sent by the another device; and determine that an identity of the another device is valid if the calculated $MacTag_B$ is equal to $MacTag_B$ sent by the another device.

A device for performing identity authentication with another device is provided, the device including a storing unit, a processing unit and a transceiver unit, where the storing unit is configured to store a pre-shared key PSK with the another device and an identifier $ID_A$ of the another device;

the transceiver unit is configured to receive a random number $N_A$ sent by the another device;

the transceiver unit is further configured to send $N_B\|N_A\|AuthEncData_B$ to the another device and receive $N_A\|N_B\|AuthEncData_A\|MacTag_A$ sent by the another device;

the transceiver unit is further configured to send a second message authentication identifier $MacTag_B$ to the another device;

the processing unit is configured to generate a random number $ZSEED_B$ functioning as a key seed and a random number $N_B$, calculate a key $MKA\|KEIA=KDF1(N_A,N_B,PSK,ID_A,ID_B)$, calculate first encryption authentication data $AuthEncData_B=EncData_B\|MAC_B=AuthEnc_{KEIA}(AAD, IV, N_B\|N_A\|ID_B\|ID_A\|ZSEED_B)$ and generate $N_B\|N_A\|AuthEncData_B$, where MKA is an authentication key, KEIA is a message encryption and integrity key, KDF1 is a key derivation algorithm, $ID_B$ is an identifier of the device, $ID_A$ is an identifier of the another device, AuthEnc is an encryption authentication algorithm, $EncData_B$ is encryption data generated by the device, $MAC_B$ is an integrity authentication code generated by the device, AAD is other authentication data required by the encryption authentication algorithm, and IV is an initial vector;

the processing unit is further configured to perform decryption and verification on $N_A\|N_B\|AuthEncData_A\|MacTag_A$ sent by the another device;

the processing unit is further configured to calculate a shared key seed $Z=ZSEED_A\oplus ZSEED_B$, calculate a master key $MK=KDF2(N_A,N_B,Z,ID_A,ID_B)$, calculate a first message authentication identifier $MacTag_A=MAC(MK, MsgID1\|ID_A\|ID_B\|N_A\|N_B)$, compare the calculated $MacTag_A$ with the received $MacTag_A$, stop authentication if the calculated $MacTag_A$ is not equal to the received $MacTag_A$, and determine that the identity of the another device is valid and calculate a second message authentication identifier $MacTag_B=MAC(MK, MsgID2\|ID_B\|ID_A\|N_B\|N_A)$ if the calculated $MacTag_A$ is equal to the received $MacTag_A$.

An operation method for an entity A for performing identity authentication between the entity A and an entity B is provided, the entity A having a pre-shared key PSK with the entity B and knowing an identifiers $ID_B$ of the entity B, where the method includes:

generating a random number $N_A$ and sending the random number $N_A$ to the entity B;

performing decryption and verification on $N_B\|N_A\|AuthEncData_B$ sent by the entity B after $N_B\|N_A\|AuthEncData_B$ is received;

generating a random number $ZSEED_A$ functioning as a key seed, calculating second encryption authentication data $AuthEncData_A=EncData_A\|MAC_A=AuthEnc_{KEIA}(AAD, IV, N_A\|N_B\|ID_A\|ID_B\|ZSEED_A)$, calculating a shared key seed $Z=ZSEED_A\oplus ZSEED_B$, calculating a master key $MK=KDF2(N_A,N_B,Z,ID_A,ID_B)$, calculating a first message authentication identifier $MacTag_A=MAC(MK, MsgID1\|ID_A\|ID_B\|N_A\|N_B)$, and sending $N_A\|N_B\|AuthEncData_A\|MacTag_A$ to the entity B;

after the second message authentication identifier $MacTag_B$ sent by the entity B is received, calculating a second message authentication identifier $MacTag_B=MAC(MK, MsgID2\|ID_B\|ID_A\|N_B\|N_A)$, comparing the calculated $MacTag_B$ with the received $MacTag_B$, and determining that an identity of the entity B is valid if the calculated $MacTag_B$ is equal to the received $MagTagB$, where $ID_A$ is an identifier of the entity A, $ID_B$ is an identifier of the entity B, AuthEnc is an encryption authentication algorithm, $EncData_A$ is encryption data generated by the entity A, $MAC_A$ is an integrity authentication code generated by the entity A, KDF2 is a key derivation algorithm, MsgID1 and MsgID2 are message serial numbers, "$\oplus$" indicates bitwise exclusive-OR, and MAC is a message authentication code generation algorithm.

An operation method for an entity B when identification authentication is performed on an entity A and the entity B is provided, the entity B having a pre-shared key PSK with the entity A and knowing an identifiers $ID_A$ of the entity A, where the method includes:

after a random $N_A$ sent by the entity A is received, generating a random number $ZSEED_B$ functioning as a key seed and a random number $N_B$, calculating first encryption authentication data $AuthEncData_B=EncData_B\|MAC_B=AuthEnc_{KEIA}(AAD, IV, N_B\|N_A\|ID_B\|ID_A\|ZSEED_B)$, and sending $N_B\|N_A\|AuthEncData_B$ to the entity A by the entity B;

performing decryption and verification on $N_A\|N_B\|AuthEncData_A\|MacTag_A$ sent by the entity A after $N_A\|N_B\|AuthEncData_A\|MacTag_A$ is received;

calculating a shared key seed $Z=ZSEED_A\oplus ZSEED_B$, calculating a master key $MK=KDF2(N_A,N_B,Z,ID_A,ID_B)$, calculating a first message authentication identifier $MacTag_A=MAC(MK, MsgID1\|ID_A\|ID_B\|N_A\|N_B)$, comparing the calculated $MacTag_A$ with the received $MacTag_A$, stopping authentication if the calculated $MacTag_A$ is not equal to the received $MacTag_A$, and determining that an identity of the entity A is valid, calculating a second message authentication identifier $MacTag_B=MAC(MK, MsgID2\|ID_B\|ID_A\|N_B\|N_A)$ and sending $MacTag_B$ to the entity A, if the calculated $MacTag_A$ is equal to the received $MacTag_A$, where $ID_A$ is an identifier of the entity A, $ID_B$ is an identifier of the entity B, AuthEnc is an encryption authentication algorithm, $EncData_B$ is encryption data generated by the entity B, $MAC_B$ is an integrity authentication code generated by the entity B, KDF2 is a key derivation algorithm, MsgID1 and MsgID2 are message serial numbers, "⊕" indicates bitwise exclusive-OR, and MAC is a message authentication code generation algorithm.

The present disclosure includes the following advantages:
1) bidirectional authentication can be performed between two network entities and a master key is generated for protecting subsequent communication data;
2) the identity of the other party is determined while authenticating; and
3) both Data encryption and integrity protection are performed using the same algorithm and the same key, and the process is performed in a parallel manner, thereby greatly improving efficiency and reducing consumption of calculation resources of hardware and being advantageous for reducing a data transmission delay and calculation operation overlap.

DETAILED DESCRIPTION OF EMBODIMENTS

Figure 1:
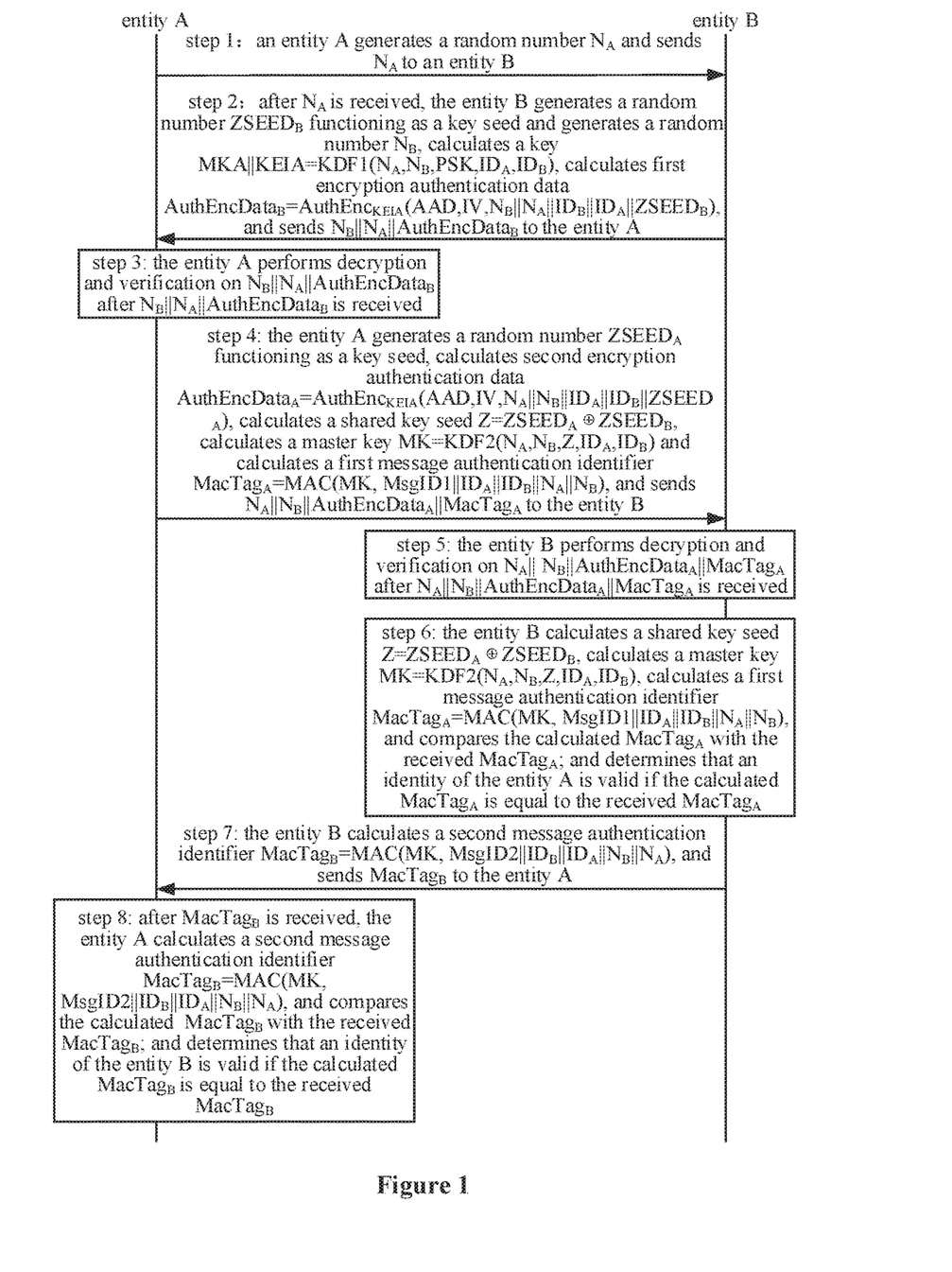
FIG. 1 is a schematic diagram of an entity authentication system according to the present disclosure, where the entity authentication system includes an entity A and an entity B.

Referring to FIG. 1, an entity authentication method based on a pre-shared key is provided according to the present disclosure. When the method is implemented, an entity A and an entity B already share a Pre-Shared Key (PSK) and know each other's identifier, where an identifier of the entity A is $ID_A$, and an identifier of the entity B is $ID_B$. The method includes step 1 to step 8 in the following.

In step 1, the entity A generates a random number $N_A$ and sends the random number $N_A$ to the entity B.

In step 2, after $N_A$ is received, the entity B generates a random number $ZSEED_B$ functioning as a key seed and generates a random number $N_B$, calculates a key $MKA\|KEIA=KDF1(N_A,N_B,PSK,ID_A,ID_B)$, calculates first encryption authentication data $AuthEncData_B=EncData_B\|MAC_B=AuthEnc_{KEIA}(AAD, IV, N_B\|N_A\|ID_B\|ID_A\|ZSEED_B)$, and sends $N_B\|N_A\|AuthEncData_B$ to the entity A. $AuthEncData_B$ includes $EncData_B$ and $MAC_B$ and is generated by KEIA calculation. MKA is an authentication key, KEIA is a message encryption and integrity key, KDF1 is a key derivation algorithm. The key derivation algorithm in the present disclosure may be a Pseudo-Random Function-128 (PRF-128) or the like; AuthEnc is an encryption authentication algorithm, the encryption authentication algorithm in the present disclosure may be the Galois Counter Mode (GCM) or the like. $EncData_B$ is encryption data generated by the entity B, $MAC_B$ is an integrity authentication code generated by the entity B, AAD is other authentication data required by the encryption authentication calculation method, and IV is an initial vector. Here, "∥" indicates combination of fields, which does not limit an order of fields, throughout the disclosure. In addition, fields combined by "∥" may be considered as forming a "field group". It should be noted that, the "field group" in the present disclosure is inclusive, that is, other than the fields included in the "field group", other fields may also be included in the "field group".

In step 3, the entity A performs decryption and verification on $N_B\|N_A\|AuthEncData_B$ after $N_B\|N_A\|AuthEncData_B$ is received; stops authentication if authenticating as incorrect; and performs subsequent steps if authenticating as correct.

In step 4, the entity A generates a random number $ZSEED_A$ functioning as a key seed, calculates second encryption authentication data $AuthEncData_A=EncData_A\|MAC_A=AuthEnc_{KEIA}(AAD, IV, N_A\|N_B\|ID_A\|ID_B\|ZSEED_A)$, calculates a shared key seed $Z=ZSEED_A\oplus ZSEED_B$, calculates a master key $MK=KDF2(N_A,N_B,Z,ID_A,ID_B)$, calculates a first message authentication identifier $MacTag_A=MAC(MK, MsgID1\|ID_A\|ID_B\|N_A\|N_B)$. $AuthEncData_A$ includes $EncData_A$ and $MAC_A$ and is generated by KEIA calculation. $EncData_A$ is encryption data generated by the entity A, $MAC_A$ is an integrity authentication code generated by the entity A. KDF2 is a key derivation algorithm, MsgID1 is a message serial number (which may be predetermined by the entity A and the entity B or may be obtained by interacting through a message between the entity A and the entity B), "⊕" indicates bitwise exclusive-OR, MAC is a message authentication code generation algorithm, and the message authentication code generation algorithm in the present disclosure may be Cipher-based Message Authentication Code (CMAC) or the like. The entity A sends $N_A\|N_B\|AuthEncData_A\|MacTag_A$ to the entity B.

In step 5, the entity B performs decryption and verification on $N_A\|N_B\|AuthEncData_A\|MacTag_A$ after $N_A\|N_B\|AuthEncData_A\|MacTag_A$ is received; stops authentication if authenticating as incorrect; and performs subsequent steps if authenticating as correct.

In step 6, the entity B calculates a shared key seed $Z=ZSEED_A\oplus ZSEED_B$, calculates a master key $MK=KDF2(N_A,N_B,Z,ID_A,ID_B)$, calculates a message authentication identifier $MacTag_A=MAC(MK, MsgID1\|ID_A\|ID_B\|N_A\|N_B)$ and compares the calculated $MacTag_A$ with the received $MacTag_A$; stops authentication if the calculated $MacTag_A$ is not equal to the received $MacTag_A$; and determines that an identity of the entity A is valid and performs subsequent steps if the calculated $MacTag_A$ is equal to the received $MacTag_A$.

In step 7, the entity B calculates a message authentication identifier $MacTag_B=MAC(MK, MsgID2\|ID_B\|ID_A\|N_B\|N_A)$ and sends $MacTag_B$ to the entity A. MsgID2 is a message serial number (which may be predetermined by the entity A and the entity B or may be obtained by interacting through a message between the entity A and the entity B).

In step 8, after $MacTag_B$ is received, the entity A calculates a message authentication identifier $MacTag_B=MAC(MK, MsgID2\|ID_B\|ID_A\|N_B\|N_A)$ and compares the calculated $MacTag_B$ with the received $MacTag_B$; and determines that an identify of the entity B is valid if the calculated $MacTag_B$ is equal to the received $MacTag_B$.

In step 2, the other authentication data AAD for calculating the first encryption authentication data $AuthEncData_B$ includes protocol parameters and is set as $AAD=SEP\|PID$. SEP is a security protocol parameter, PID is a protocol identifier, and both SEP and the PID conform to definitions of the Standard ISO/IEC 13157-1.

The initial vector IV for calculating the first encryption authentication data $AuthEncData_B$ is generated by the key derivation algorithm and is set as a low 96-bit value of a calculation result of $KDF3(MKA, KEIA, N_A, N_B)$, where KDF3 is a key derivation algorithm.

In step 3 described above, the performing decryption and verification on $N_B\|N_A\|AuthEncData_B$ by the entity A after $N_B\|N_A\|AuthEncData_B$ is received may include step 3.1 to step 3.3 in the following.

In step 3.1, the entity A checks whether the received $N_A$ is equal to $N_A$ sent to the entity B; and authenticates as incorrect if the received $N_A$ is not equal to $N_A$ sent to the entity B.

In step 3.2, the entity A calculates a key $MKA\|KEIA=KDF1(N_A,N_B,PSK,ID_A,ID_B)$.

In step 3.3, the entity A calculates $EncData_B\|MAC_B$ in $AuthEncData_B$ by decrypting with $N_A\|N_B\|ID_A\|ID_B\|ZSEED_B\|MAC_B=AuthDec_{KEIA}(AAD,IV, AuthEncData_B)$; determines whether the calculated $MAC_B$ is equal to $MAC_B$ in the received $AuthEncData_B$, authenticates as incorrect if the calculated $MAC_B$ is not equal to the received $MAC_B$; checks whether $ID_A$ and $ID_B$ obtained by decryption are the same as the identifiers of the entity A and the entity B, authenticates as incorrect if the obtained $ID_A$ and $ID_B$ are not the same as the identifiers of the entity A and the entity B; checks whether $N_A$ obtained by decryption is equal to $N_A$ sent to the entity B, authenticates as incorrect if the obtained $N_A$ is not equal to $N_A$ sent to the entity B; and checks whether $N_B$ obtained by decryption is equal to $N_B$ in the received $N_B\|N_A\|AuthEncData_B$, authenticates as incorrect if the obtained $N_B$ is not equal to the received $N_B$. $AuthEncData_B$ includes $EncData_B$ and $MAC_B$ and is decrypted and authenticated through KEIA; AuthDec is a decryption authentication algorithm, the decryption authentication algorithm in the present disclosure may be the Galois Counter Mode (GCM) or the like; and the values of AAD and IV may be set using the same method as that used for setting the values of AAD and IV in step 2.

It should be noted that, the above verification steps are not necessarily performed in a strict order, and the $N_B\|N_A\|AuthEncData_B$ received by the entity A is authenticated as incorrect if none of the above authentication has a positive result.

In step 4 described above, the other authentication data AAD for calculating the second encryption authentication data $AuthEncData_A$ includes protocol parameters and is set as $AAD=SEP\|PID$, where SEP is a security protocol parameter, PID a protocol identifier, and both SEP and PID conform to definitions of the Standard ISO/IEC 13157-1.

The initial vector IV for calculating the second encryption authentication data $AuthEncData_A$ is generated by the key derivation algorithm and is set as a high 96-bit value of a calculation result of $KDF3(MKA,KEIA,N_A,N_B)$, where KDF3 is a key derivation algorithm.

In step 5 described above, the performing decryption and verification on $N_A\|N_B\|AuthEncData_A\|MacTag_A$ by the entity B after $N_A\|N_B\|AuthEncData_A\|MacTag_A$ is received may include step 5.1 to step 5.3 in the following.

In step 5.1, the entity B checks whether the received $N_A$ is equal to $N_A$ sent to the entity A, and authenticates as incorrect if the received $N_A$ is not equal to $N_A$ sent to the entity A.

In step 5.2, the entity B checks whether the received $N_B$ is equal to $N_B$ sent to the entity A, and authenticates as incorrect if the received $N_B$ is not equal to $N_B$ sent to the entity A.

In step 5.3, the entity B calculates $EncData_A\|MAC_A$ in $AuthEncData_A$ by decrypting with $N_A\|N_B\|ID_A\|ID_B\|ZSEED_A\|MAC_A=AuthDec_{KEIA}(AAD,IV, AuthEncData_A)$; determines whether the calculated $MAC_A$ is equal to $MAC_A$ in the received $AuthEncData_A$, authenticates as incorrect if the calculated $MAC_A$ is not equal to the received $MAC_A$; checks whether $ID_A$ and $ID_B$ obtained by decryption are the same as the identifiers of the entity A and the entity B, authenticates as incorrect if the obtained $ID_A$ and $ID_B$ are not the same as the identifiers of the entity A and the entity B; checks whether $N_A$ and $N_B$ obtained by decryption are equal to $N_A$ and $N_B$ sent to the entity A, and authenticates as incorrect if the obtained $N_A$ and $N_B$ are not equal to $N_A$ and $N_B$ sent to the entity A. $AuthEncData_A$ includes $EncData_A$ and $MAC_A$ and is decrypted and authenticated through KEIA, AuthDec is a decryption authentication algorithm, and values of AAD and IV are set using the same method as that used for setting the values of AAD and IV in step 4.

It should be noted that, the above verification steps are not necessarily performed in a strict order, and $N_A\|N_B\|EncData_A\|MAC_A\|MacTag_A$ received by the entity B is authenticated as incorrect if one of the above authentications has a negative result.

Figure 2:
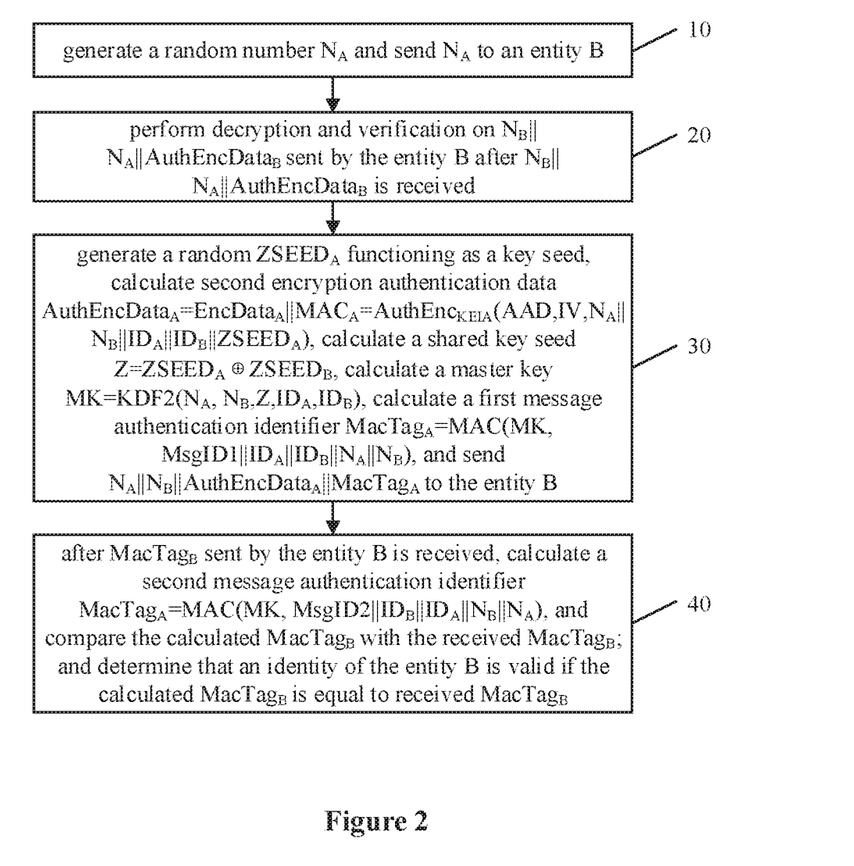
FIG. 2 is a flowchart of operations performed by the entity A according to the present disclosure.

Referring to FIG. 2, based on the entity authentication method described above, an operation method for an entity A for implementing the method described above is further provided according to the present disclosure, which includes step 10 to step 40 in the following.

In step 10, a random number $N_A$ is generated and $N_A$ is sent to an entity B.

In step 20, decryption and verification is performed on $N_B\|N_A\|AuthEncData_B$ sent by the entity B after $N_B\|N_A\|AuthEncData_B$ is received; authentication is stopped if authenticating as incorrect; and subsequent steps are performed if authenticating as correct.

In step 30, a random number $ZSEED_A$ functioning as a key seed is generated, second encryption authentication data $AuthEncData_A=EncData_A\|MAC_A=AuthEnc_{KEIA}(AAD, IV, N_A\|N_B\|ID_A\|ID_B\|ZSEED_A)$ is calculated, a shared key seed $Z=ZSEED_A \oplus ZSEED_B$ is calculated, a mater key $MK=KDF2(N_A,N_B,Z,ID_A,ID_B)$ is calculated, a first message authentication identifier $MacTag_A=MAC(MK, MsgID1\|ID_A\|ID_B\|N_A\|N_B)$ is calculated, and $N_A\|N_B\|AuthEncData_A\|MacTag_A$ is sent to the entity B.

In step 40, after the second message authentication identifier $MacTag_B$ sent by the entity B is received, a second message authentication identifier $MacTag_B=MAC(MK, MsgID2\|ID_B\|ID_A\|N_B\|N_A)$ is calculated, and the calculated $MacTag_B$ is compared with the received $MacTag_B$. It is determined that an identity of the entity B is valid if the calculated $MacTag_B$ is equal to the received $MacTag_B$.

The performing decryption and verification on $N_B\|N_A\|AuthEncData_B$ sent by the entity B after $N_B\|N_A\|AuthEncData_B$ is received in step 20 described above may include step 21 to step 23 in the following.

In step 21, it is checked whether the received $N_A$ is equal to $N_A$ sent to the entity B, and it is authenticated as incorrect if the received $N_A$ is not equal to $N_A$ sent to the entity B.

In step 22, a key $MKA\|KEIA=KDF1(N_A,N_B,PSK,ID_A,ID_B)$ is calculated.

In step 23, $EncData_B\|MAC_B$ in the first encryption authentication data $AuthEncData_B$ is calculated by decrypting with $N_A\|N_B\|ID_A\|ID_B\|ZSEED_B\|MAC_B=AuthDec_{KEIA}$ (AAD,IV,AuthEncData$_B$); it is determined whether the calculated MAC$_B$ is equal to MAC$_B$ in the received AuthEncData$_B$, and it is authenticated as incorrect if the calculated MAC$_B$ is not equal to the received MAC$_B$; it is checked whether ID$_A$ and ID$_B$ obtained by decryption are the same as identifiers of the entity A and the entity B, and it is authenticated as incorrect if the obtained ID$_A$ and ID$_B$ are not the same as the identifiers of the entity A and the entity B; it is checked whether N$_A$ obtained by decryption is equal to N$_A$ sent to the entity B, and it is authenticated as incorrect if the obtained N$_A$ is not equal to N$_A$ sent to the entity B; and it is checked whether N$_B$ obtained by decryption is equal to N$_B$ in the received N$_B$$\|$N$_A$$\|$AuthEncData$_B$, and it is authenticated as incorrect if the obtained N$_B$ is not equal to N$_B$ in the received N$_B$$\|$N$_A$$\|$AuthEncData$_B$. The first encryption authentication data AuthEncData$_B$ includes EncData$_B$ and MAC$_B$ and is decrypted and authenticated through by KEIA. The other authentication data AAD includes protocol parameters and is set as AAD=SEP$\|$PID, where SEP is a security protocol parameter, PID is a protocol identifier, and both SEP and PID conform to definitions of the Standard ISO/IEC 13157-1. The initial vector IV is generated by a key derivation algorithm and is set as a low 96-bity value of a calculation result of KDF3(MKA,KEIA,N$_A$,N$_B$), where KDF3 is a key derivation algorithm.

It should be noted that, the above verification steps are not necessarily performed in a strict order, and the received N$_B$$\|$N$_A$$\|$AuthEncData$_B$ is authenticated as incorrect if one of the above authentications has a negative result.

The second encryption authentication data AuthEncData$_A$ calculated in step 30 described above includes EncData$_A$ and MAC$_A$ and is generated by KEIA calculation. The other authentication data AAD includes protocol parameters and is set as AAD=SEP$\|$PID, where SEP is a security protocol parameter and PID is a protocol identifier, and both SEP and PID conform to definitions of the Standard ISO/IEC 13157-1. The initial vector IV is generated by a key derivation algorithm and is set as a high 96-bit value of a calculation result of KDF3(MKA,KEIA,N$_A$,N$_B$), where KDF3 is a key derivation algorithm.

Figure 3:
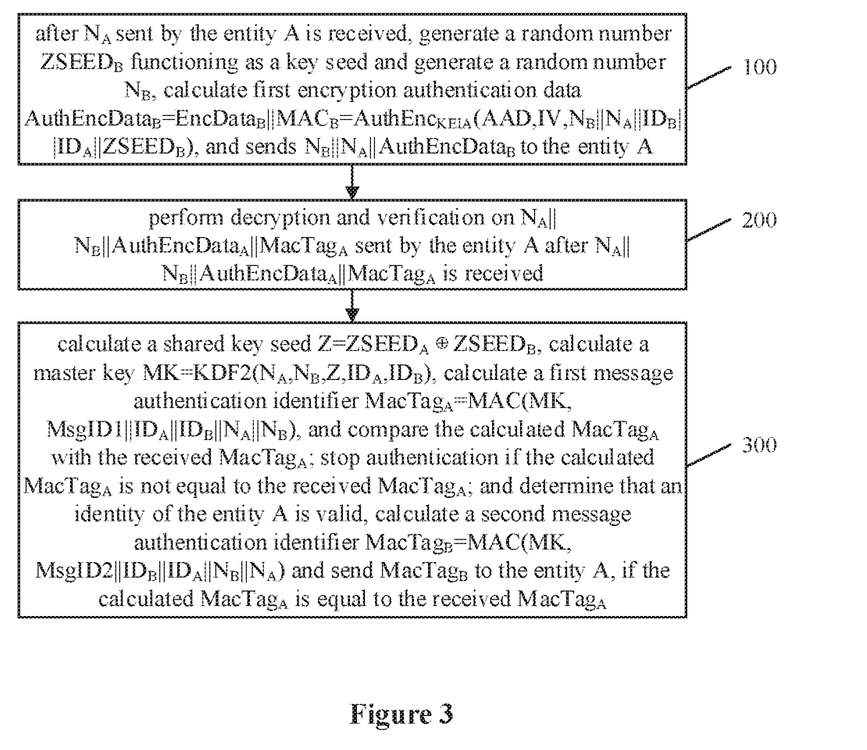
FIG. 3 is a flow schematic diagram of operations performed by the entity B according to the present disclosure.

Referring to FIG. 3, based on the above entity authentication method, an operation method for an entity B for implementing the method described above is further provided according to the present disclosure, which includes step 100 to step 300 in the following.

In step 100, after a random number N$_A$ sent by the entity A is received, the entity B generates a random number ZSEED$_B$ functioning as a key seed and a random number N$_B$, calculates first encryption authentication data AuthEncData$_B$=EncData$_B$$\|$MAC$_B$=AuthEnc$_{KEIA}$(AAD, IV, N$_B$$\|$N$_A$$\|$ID$_B$$\|$ID$_A$$\|$ZSEED$_B$), and the entity B sends N$_B$$\|$N$_A$$\|$AuthEncData$_B$ to the entity A.

In step 200, the entity B performs decryption and verification on N$_A$$\|$N$_B$$\|$AuthEncData$_A$$\|$MacTag$_A$ after N$_A$$\|$N$_B$$\|$AuthEncData$_A$$\|$MacTag$_A$ sent by the entity A is received; stops authentication if authenticating as incorrect; and performs subsequent steps if authenticating as correct.

In step 300, the entity B calculates a shared key seed Z=ZSEED$_A$⊕ZSEED$_B$, calculates a master key MK=KDF2 (N$_A$,N$_B$,Z,ID$_A$,ID$_B$), calculates a message authentication identifier MacTag$_A$=MAC(MK, MsgID1$\|$ID$_A$$\|$ID$_B$$\|$N$_A$$\|$N$_B$), and compares the calculated MacTag$_A$ with the received MacTag$_A$; stops authentication if the calculated MacTag$_A$ is not equal to the received MacTag$_A$; and determines that an identity of the entity A is valid, calculates a message authentication identifier MacTag$_B$=MAC(MK, MsgID2$\|$ID$_B$$\|$ID$_A$$\|$N$_B$$\|$N$_A$), and sends MacTag$_B$ to the entity A, if the calculated MacTag$_A$ is equal to the received MacTag$_A$.

Specifically, the calculating first encryption authentication data AuthEncData$_B$ described above may be performed as follows.

AuthEncData$_B$ includes EncData$_B$ and MAC$_B$ and is generated by KEIA calculation.

The other authentication data AAD includes protocol parameters and is set as AAD=SEP$\|$PID, where SEP is a security protocol parameter, PID is a protocol identifier, and both SEP and PID conform to definitions of the Standard ISO/IEC 13157-1.

The initial vector IV is generated by a key derivation algorithm and is set as a low 96-bit value of a calculation result of KDF3(MKA,KEIA,N$_A$,N$_B$), where KDF3 is a key derivation algorithm.

The performing decryption and verification on N$_A$$\|$N$_B$$\|$AuthEncData$_A$$\|$MacTag$_A$ sent by the entity A after N$_A$$\|$N$_B$$\|$AuthEncData$_A$$\|$MacTag$_A$ is received in step 200 described above may include step 201 to step 203 in the following.

In step 201, it is checked whether the received N$_A$ is equal to N$_A$ sent to the entity A; and it is authenticated as incorrect if the received N$_A$ is not equal to N$_A$ sent to the entity A.

In step 202, it is checked whether the received N$_B$ is equal to N$_B$ sent to the entity A; and it is authenticated as incorrect if the received N$_B$ is not equal to N$_B$ sent to the entity A.

In step 203, EncData$_A$$\|$MAC$_A$ in AuthEncData$_A$ is calculated by decrypting with N$_A$$\|$N$_B$$\|$ID$_A$$\|$ID$_B$$\|$ZSEED$_A$$\|$MAC$_A$=AuthDec$_{KEIA}$(AAD,IV, AuthEncData$_A$); it is determined whether the calculated MAC$_A$ is equal to MAC$_A$ in the received AutheEncDataA, and it is authenticated as incorrect if the calculated MAC$_A$ is not equal to the received MAC$_A$; it is checked whether ID$_A$ and ID$_B$ obtained by decryption are the same as identifiers of the entity A and the entity B, and it is authenticated as incorrect if the obtained ID$_A$ and ID$_B$ are not the same as the identifiers of the entity A and the entity B; and it is checked whether N$_A$ and N$_B$ obtained by decryption are equal to N$_A$ and N$_B$ sent to the entity A, and it is authenticated as incorrect if the obtained N$_A$ and N$_B$ are not equal to N$_A$ and N$_B$ sent to the entity A. AuthEncData$_A$ includes EncData$_A$ and MAC$_A$ and is decrypted and authenticated through KEIA. The other authentication data AAD includes protocol parameters and is set as AAD=SEP$\|$PID, where SEP is a security protocol parameter, PID is a protocol identifier, and both SEP and PID conform to definitions of the Standard ISO/IEC 13157-1; the initial vector IV is generated by a key derivation algorithm and is set as a high 96-bit value of a calculation result of KDF3(MKA,KEIA,N$_A$,N$_B$), where KDF3 is a key derivation algorithm.

It should be noted that, the above verification steps are not necessarily performed in a strict order, and the received N$_A$$\|$N$_B$$\|$AuthEncData$_A$$\|$MacTag$_A$ is authenticated as incorrect if one of the above authentications has a negative result.

Figure 4:
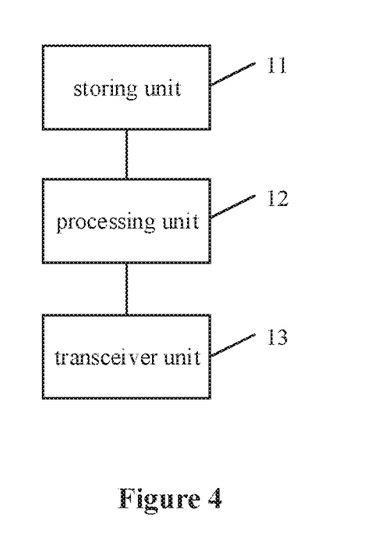
FIG. 4 is a schematic structural diagram of a device corresponding to the entity A according to the present disclosure.

Referring to FIG. 4, based on the entity authentication method described above, a device corresponding to an entity A for implementing the method described above is further provided according to the present disclosure. The device includes a storing unit 11, a processing unit 12 and a transceiver unit 13.

The storing unit 11 is configured to store a pre-shared key PSK with another device and an identifiers ID$_B$ of the another device; and the transceiver unit is configured to send a random number N$_A$ to the another device and receive N$_B$$\|$N$_A$$\|$AuthEncData$_B$ sent by the another device.

The transceiver unit 13 is further configured to send $N_A\|N_B\|AuthEncData_A\|MacTag_A$ to the another device and receive a second message authentication identifier $MacTag_B$ sent by the another device.

The processing unit 12 is configured to generate a random number $N_A$.

The processing unit 12 is further configured to perform decryption and verification on $N_B\|N_A\|AuthEncData_B$ sent by the another device.

The processing unit 12 is further configured to generate a random number $ZSEED_A$ functioning as a key seed, calculate second encryption authentication data $AuthEncData_A=EncData_A\|MAC_A=AuthEnc_{KEIA}(AAD, IV, N_A\|N_B\|ID_A\|ID_B\|ZSEED_A)$, calculate a shared key seed $Z=ZSEED_A\oplus ZSEED_B$, calculate a master key $MK=KDF2(N_A,N_B,Z,ID_A,ID_B)$, calculate a first message authentication identifier $MacTag_A=MAC(MK, MsgID1\|ID_A\|ID_B\|N_A\|N_B)$ and generate $N_A\|N_B\|AuthEncData_A\|MacTag_A$. AuthEnc is an encryption authentication algorithm, $EncData_A$ is encryption data generated by the device, $MAC_A$ is an integrity authentication code generated by the device, AAD is other authentication data required by the encryption authentication algorithm, IV is an initial vector, $ID_A$ is an identifier of the device, $ID_B$ is an identifier of the another device, KDF2 is a key derivation algorithm, MsgID1 is a message serial number, MAC is a message authentication code generation algorithm, and "$\oplus$" indicates bitwise exclusive-OR.

The processing unit 12 is further configured to calculate a second message authentication identifier $MacTag_B=MAC(MK, MsgID2\|ID_B\|ID_A\|N_B\|N_A)$, compare the calculated $MacTag_B$ with $MacTag_B$ sent by the another device, and determine that an identity of the another device is valid if the calculated $MacTag_B$ is equal to $MacTag_B$ sent by the another device.

The processing unit 12 may be further configured to perform decryption and verification on $N_B\|N_A\|AuthEncData_B$ sent by the another device as follows.

the processing unit 12 is configured to check whether the received $N_A$ is equal to $N_A$ sent to the another device; and authenticate as incorrect if the received $N_A$ is not equal to $N_A$ sent to the another device;

the processing unit 12 is configured to calculate a key $MKA\|KEIA=KDF1(N_A,N_B,PSK,ID_A,ID_B)$ the processing unit 12 is configured to calculate $EncData_B\|MAC_B$ in $AuthEncData_B$ by decrypting with $N_A\|N_B\|ID_A\|ID_B\|ZSEED_B\|MAC_B=AuthDec_{KEIA}(AAD,IV,AuthEncData_B)$; determine whether the calculated $MAC_B$ is equal to $MAC_B$ in the received $AuthEncData_B$, and authenticate as incorrect if the calculated $MAC_B$ is not equal to $MAC_B$ in the received $AuthEncData_B$; check whether $ID_A$ and $ID_B$ obtained by decryption are the same as identifiers of the device and the another device, authenticate as incorrect if the obtained $ID_A$ and $ID_B$ are not the same as the identifiers of the device and the another device; check whether $N_A$ obtained by decryption is equal to $N_A$ sent to the another device, authenticate as incorrect if the obtained $N_A$ is not equal to $N_A$ sent to the another device; and check whether $N_B$ obtained by decryption is equal to $N_B$ in $N_B\|N_A\|AuthEncData_B$, and authenticate as incorrect if the obtained $N_B$ is not equal to $N_B$ in $N_B\|N_A\|AuthEncData_B$, where AuthDec is a decryption authentication algorithm.

It should be noted that, the above verification steps are not necessarily performed in a strict order, and $N_B\|N_A\|AuthEncData_B$ sent by the another device is authenticated as incorrect if one of the above authentications has a negative result.

The processing unit 12 is further configured to calculate encryption authentication data $AuthEncData_A$, where $AuthEncData_A$ includes $EncData_A$ and $MAC_A$ and is generated by KEIA calculation.

The other authentication data AAD includes protocol parameters, and the processing unit 12 sets AAD as $AAD=SEP\|PID$, where both SEP and PID conform to definitions of the ISO/IEC 13157-1.

The initial vector IV is generated by a key derivation algorithm, and the processing unit 12 sets the initial vector IV as a high 96-bit value of a calculation result of $KDF3(MKA,KEIA,N_A,N_B)$, where KDF3 is a key derivation algorithm.

Figure 5:
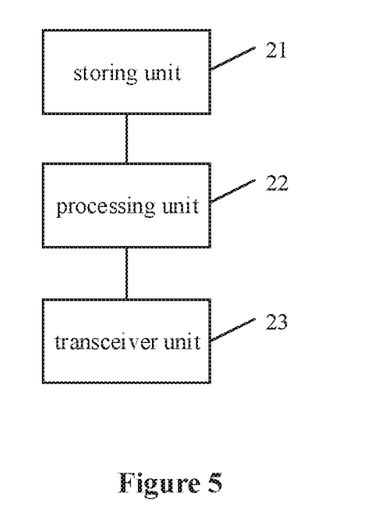
FIG. 5 is a schematic structural diagram of a device corresponding to the entity B according to the present disclosure.

Referring to FIG. 5, based on the authentication method described above, a device corresponding to an entity B for implementing the method described above is further provided according to the present disclosure. The device includes a storing unit 21, a processing unit 22 and a transceiver unit 23.

The storing unit 21 is configured to store a pre-shared key PSK with another device and an identifiers $ID_A$ of the another device.

The transceiver unit 23 is configured to receive a random number $N_A$ sent by the another device.

The transceiver unit 23 is further configured to send $N_B\|N_A\|AuthEncData_B$ to the another device and receive $N_A\|N_B\|AuthEncData_A\|MacTag_A$ sent by the another device.

The transceiver unit 23 is further configured to send a second message authentication identifier $MacTag_B$ to the another device.

The processing unit 22 is configured to generate a random number $ZSEED_B$ functioning as a key seed and a random number $N_B$, calculate a key $MKA\|KEIA=KDF1(N_A,N_B,PSK,ID_A,ID_B)$, calculate first encryption authentication data $AuthEncData_B=EncData_B\|MAC_B=AuthEnc_{KEIA}(AAD, IV, N_B\|N_A\|ID_B\|ID_A\|ZSEED_B)$, and generate $N_B\|N_A\|AuthEncData_B$. In which, MKA is an authentication key, KEIA is a message encryption and integrity key, KDF1 is a key derivation algorithm, $ID_B$ is an identifier of the device, $ID_A$ is an identifier of the another device, AuthEnc is an encryption authentication algorithm, $EncData_B$ is encryption data generated by the device, $MAC_B$ is an integrity authentication code generated by the device, AAD is other authentication data required by the encryption authentication algorithm, and IV is an initial vector.

The processing unit 22 is further configured to perform decryption and verification on $N_A\|N_B\|AuthEncData_A\|MacTag_A$ sent by the another device.

The processing unit 22 is further configured to calculate a shared key seed $Z=ZSEED_A\oplus ZSEED_B$, calculate a master key $MK=KDF2(N_A,N_B,Z,ID_A,ID_B)$, calculate a first message authentication identifier $MacTag_A=MAC(MK, MsgID1\|ID_A\|ID_B\|N_A\|N_B)$, and compare the calculated $MacTag_A$ with the received $MacTag_A$; stop authentication if the calculated $MacTag_A$ is not equal to the received $MacTag_A$; and determine that an identifier of the another device is valid and calculate a second message authentication identifier $MacTag_B=MAC(MK, MsgID2\|ID_B\|ID_A\|N_B\|N_A)$ if the calculated $MacTag_A$ is equal to the received $MacTag_A$.

The processing unit 22 is further configured to perform decryption and verification on $N_A\|N_B\|AuthEncData_A\|MacTag_A$ sent by the another device as follows.

The processing unit 22 is configured to check whether the received $N_A$ is equal to $N_A$ sent to the another device; and authenticate as incorrect if the received $N_A$ is not equal to $N_A$ sent to the another device.

The processing unit 22 is configured to check whether the received $N_B$ is equal to $N_B$ sent to the another device; and authenticate as incorrect if the received $N_B$ is not equal to $N_B$ sent to the another device.

The processing unit 22 is configured to calculate $EncData_A\|MAC_A$ in $AuthEncData_A$ by decrypting with $N_A\|N_B\|ID_A\|ID_B\|ZSEED_A\|MAC_A=AuthDec_{KEIA}$ (AAD,IV,AuthEncData$_A$); determine whether the calculated $MAC_A$ is equal to $MAC_B$ in $AuthEncData_A$, authenticate as incorrect if the calculated $MAC_B$ is not equal to the received $MAC_B$; check whether $ID_A$ and $ID_B$ obtained by decryption are the same as identifiers of the another device and the device, authenticate as incorrect if the obtained $ID_A$ and $ID_B$ are not the same as the identifiers of the another device and the device; check whether $N_A$ and $N_B$ obtained by decryption are equal to $N_A$ and $N_B$ sent to the another device, and authenticate as incorrect if the obtained $N_A$ and $N_B$ are not equal to $N_A$ and $N_B$ sent to the another device.

It should be noted that, the above verification steps are not necessarily performed in a strict order, and $N_A\|N_B\|AuthEncData_A\|MacTag_A$ sent by the another device is authenticated as incorrect if one of the above authentications has a negative result.

$AuthEncData_B$ includes $EncData_B$ and $MAC_B$ and is decrypted and authenticated through KEIA. The other authentication data AAD includes protocol parameters and is set as AAD=SEP$\|$PID, where SEP and PID conform to definitions of the Standard ISO/IEC 13157-1; and the initial vector IV is generated by a key derivation algorithm and is set as a low 96-bit value of a calculation result of KDF3 (MKA,KEIA,$N_A$,$N_B$), where KDF3 is a key derivation algorithm.

FIG. 4 and FIG. 5 describe the devices corresponding to the entity A and the entity B, and the description of the devices corresponding to the entity authentication method according to the present disclosure is not repeated here.

In summary, in the present disclosure, identity authentication between the entities having a key negotiation function is implemented based on the symmetric cipher algorithm, and which may be applied widely. For example, the technical solution of the present disclosure may be adapted to fields of communication based on an air interface, such as radio frequency identification RFID, a sensor network WSN, near field communication NFC, a non-contact card and a wireless local area network WLAN. The entity A and the entity B may be a reader/writer and a label in the RFID field, a node in the sensor network, a terminal apparatus in the NFC field, a card reader and a card in the technical field of the non-contact card, and a terminal and an access point in the wireless local area network, or the like.

In addition, in a preferred embodiment of the present disclosure, when the technical solution of the present disclosure is applied to an NFC field, $N_A$ sent from the entity A to the entity B is transmitted after being encapsulated in an ACT_REQ protocol data unit, $N_B\|N_A\|AuthEncData_B$ sent from the entity B to the entity A is transmitted after being encapsulated in an ACT_RES protocol data unit, $N_A\|N_B\|AuthEncData_A\|MacTag_A$ sent from the entity A to the entity B is transmitted after being encapsulated in a VFY_REQ protocol data unit, and MacTag$_B$ sent from the entity B to the entity A is transmitted after being encapsulated in a VFY_RES protocol data unit, where ACT_REQ, ACT_RES, VFY_REQ and VFY_RES are protocol data unit formats conforming to definitions of the Standard ISO/IEC 13157-1. By encapsulating in this way, the technical solutions of the present disclosure are more compatible with other existing security mechanisms of the NFC.

It should be understood by those skilled in the art that the embodiments of the present disclosure may be implemented as a method, a system or a computer program product. Therefore, the present disclosure may be implemented by only hardware embodiments, only software embodiments or embodiments combining software with hardware. Alternatively, the present disclosure may be implemented as computer program products implemented on one or more computer available storage mediums (including but not limited to a magnetic disk memory, CD-ROM and an optical memory or the like) including computer readable program codes.

The present disclosure is described with reference to flowcharts and/or block diagrams of the methods, apparatus (systems) and computer program products according to the present disclosure. It should be understood that, each flow and/or block in the flowcharts and/or block diagrams and a combination of flows and/or blocks in the flowcharts and/or block diagrams may be implemented by computer program instructions. The computer program instructions may be provided to a general-purpose computer, a dedicated computer, an embedded processor or processors of other programmable data processing apparatus to generate a machine, such that the instructions executed by the computer or the processors of the other programmable data processing apparatus generate a device for implementing functions specified in one or more flows of the flowcharts and/or one or more blocks of the block diagrams.

The computer program instructions may also be stored in a computer readable memory which can guide the computer or other programmable data processing apparatus to operate in a certain manner, such that the instructions stored in the computer readable memory generate a product including an instruction device which implements functions specified in one or more flows of the flowcharts and/or one or more blocks of the block diagrams.

The computer program instructions may also be loaded to the computer or other programmable data processing apparatus, such that the computer or other programmable apparatus perform a series of operation steps to generate processing implemented by the computer, and thus the instructions executed on the computer or other programmable apparatus provide steps for implementing the functions specified in one or more flows of the flowcharts and/or one or more blocks of the block diagrams.

Although the preferred embodiments of the present disclosure are described, those skilled in the art may make additional changes and modifications to the embodiments once they know the basic inventive concepts. Therefore, the appended claims are intended to be explained as including the preferred embodiments and all changes and modifications falling within the scope of the present disclosure.

Apparently, those skilled in the art may make various changes and variations to the present disclosure without departing from the spirit and scope of the present disclosure. In this case, if the changes and variations of the present disclosure fall within the scope of the claims of the present disclosure and equivalent technologies thereof, the present disclosure is intended to include the changes and variations.

The invention claimed is:

1. An device authentication method based on a pre-shared key, comprising:
   step 1), generating, by an device A, a random number $N_A$, and sending, by the device A, the random number $N_A$ to an device B;

step 2), after $N_A$ is received by the device B, generating, by the device B, a random number $ZSEED_B$ functioning as a key seed and a random number $N_B$, deriving, by the device B, an authentication key MKA and a message encryption-and-integrity key KEIA by using a first key derivation algorithm KDF1, encrypting, by the device B, an other authentication data AAD, an initial vector IV, and a first combination of fields, by using an encryption authentication algorithm $AuthEnc_{KEIA}$ that is derived based on the KEIA, to acquire first encryption authentication data AuthEncDataB, and sending, by the device B, a second combination of fields to the device A;

step 3), deriving, by the device A, the MKA and KEIA by using the KDF1, performing, by the device A, decryption and verification on the second combination of fields, to acquire $ZSEED_B$;

step 4), generating, by the device A, a random number $ZSEED_A$ functioning as a key seed, encrypting, by the device A, the AAD, the IV, and a third combination of fields by using the $AuthEnc_{KEIA}$, to acquire second encryption authentication data AuthEncDataA, calculating, by the device A, a shared key seed Z by an exclusive-OR between the $ZSEED_A$ and $ZSEED_B$, deriving, by the device A, a master key MK based on the $N_A$, the $N_B$, the $ID_A$, the $ID_B$, and the Z, wherein the MK is calculated by using a second key derivation algorithm KDF2, generating, by the device A, a fourth combination of fields comprising a message serial number MsgID1, by using a massage authentication code generation algorithm MAC and the MK, to calculate a first message authentication identifier $MacTag_A$, and sending, by the device A, a fifth combination of fields to the device B;

step 5), performing, by the device B, decryption and verification on the fifth combination of fields, to acquire $ZSEED_A$;

step 6), calculating, by the device B, the Z and the MK generating, by the device B, the fourth combination of fields by using the MAC and the MK, to calculate another $MacTag_A$, comparing, by the device B, the calculated another $MacTag_A$ with the received $MacTag_A$, and determining, by the device B, that an identity of the device A is valid if the calculated another $MacTag_A$ is equal to the received $MacTag_A$;

step 7), generating, by the device B, a sixth combination of fields comprising another message serial number MsgID2 by using the MAC and the MK, to calculate a second message authentication identifier $MacTag_B$, and sending, by the device B, $MacTag_B$ to the device A; and step 8), after the $MacTag_B$ is received by the device A, generating, by the device A, the sixth combination of fields by using the MAC and the MK, to calculate another $MacTag_B$, comparing, by the device A, the calculated another $MacTag_B$ with the received $MacTag_B$, and determining, by the device A, that an identity of the device B is valid if the calculated another $MacTag_B$ is equal to the received $MacTag_B$;

wherein the device A and the device B share the pre-shared key PSK, the $ID_A$, the $ID_B$, the MsgID1, the MsgID2;

wherein the first combination of fields comprises $N_B\|N_A\|ID_B\|ID_A\|ZSEED_B$, the second combination of fields comprises $N_B\|N_A\|AuthEncData_B$, the third combination of fields comprises $N_A\|N_B\|ID_A\|ID_B\|ZSEED_A$, the fourth combination of fields comprises , $MsgID1\|ID_A\|ID_B\|N_A\|N_B$, the fifth combination of fields comprises , $N_A\|N_B\|AuthEncData_A\|MacTag_A$, and the sixth combination of fields comprises $MsgID2\|ID_B\|ID_A\|N_B\|N_A$;

wherein $MK\|KEIA=KDF1(N_A,N_B,PSK,ID_A,ID_B)$, $AuthEncData_B=AuthEnc_{KEIA}(AAD, IV, N_B\|N_A\|ID_B\|ID_A\|ZSEED_B)$, $AuthEncData_A=AuthEnc_{KEIA}(AAD, IV, N_A\|N_B\|ID_A\|ID_B\|ZSEED_A)$, $Z=ZSEED_A \oplus ZSEED_B$, $MK=KDF2(N_A,N_B,Z,ID_A,ID_B)$, $MacTag_A=MAC(MK, MsgID1\|ID_A\|ID_B\|N_A\|N_B$, $MacTag_B=MAC(MK, MsgID2\|ID_B\|ID_A\|N_B\|N_A)$; and wherein ∥ represents an operation of combining fields.

2. The method according to claim 1, wherein the first encryption authentication data $AuthEncData_B$ in step 2) comprises $EncData_B\|MAC_B$, wherein $EncData_B$ is encryption data generated by the device B, and $MAC_B$ is an integrity authentication code generated by the device B; and the second encryption authentication data $AuthEncData_A$ in step 4) comprises $EncData_A\|MAC_A$, wherein $EncData_A$ is encryption data generated by the device A, and $MAC_A$ is an integrity authentication code generated by the device A.

3. The method according to claim 2, wherein the performing decryption authentication by the A in step 3) comprises:

checking whether the received $N_A$ is equal to the $N_A$ sent to the device B, and authenticating the second combination of fields as incorrect if the received $N_A$ is not equal to the $N_A$ sent to the device B;

decrypting the $AuthEncData_B$ by using a decryption authentication algorithm $AuthDec_{KEIA}$ that is derived from the KEIA, to obtain the $N_A$, the $N_B$, the $ID_A$, the $ID_B$, the $ZSEED_B$ and the $MAC_B$, wherein $N_A\|N_B\|ID_A\|ID_B\|ZSEED_B\|MAC_B=AuthDec_{KEIA}(AAD,IV,AuthEncData_B)$;

determining whether the obtained $MAC_B$ is equal to the $MAC_B$ in the received $AuthEncData_B$, and authenticating the second combination of fields as incorrect if the obtained $MAC_B$ is not equal to the received $MAC_B$;

checking whether the $ID_A$ and the $ID_B$ obtained by decryption are same as the identifier of the device A and the device B, and authenticating the second combination of fields as incorrect if the obtained $ID_A$ and $ID_B$ are not same as the identifier of the device A and the device B;

checking whether the $N_A$ obtained by decryption is equal to the $N_A$ sent to the device B, authenticating the second combination of fields as incorrect if the obtained $N_A$ is not equal to the $N_A$ sent to the device B; and checking whether the $N_B$ obtained by decryption is equal to the $N_B$ in the received second combination of fields, and authenticating the second combination of fields as incorrect if the obtained $N_B$ is not equal to the received $N_B$.

4. The method according to claim 3, wherein $N_A$ sent from the device A to the device B is transmitted after being encapsulated in an ACT_REQ protocol data unit, $N_B\|N_A\|AuthEncData_B$ sent from the device B to the device A is transmitted after being encapsulated in an ACT_RES protocol data unit, $N_A\|N_B\|AuthEncData_A\|MacTag_A$ sent from the device A to the device B is transmitted after being encapsulated in a VFY_REQ protocol data unit, and MacTag$_B$ sent from the device B to the device A is transmitted after being encapsulated in a VFY_RES protocol data unit, where ACT_REQ, ACT_RES, VFY_REQ and VFY_RES are protocol data unit formats conforming to definitions of the Standard ISO/IEC 13157-1.

5. The method according to claim 2, wherein the performing decryption and verification on the fifth combination of fields by the device B in step 5) comprises:

checking whether the received $N_A$ is equal to the $N_A$ sent to the device A, and authenticating the fifth combination of fields as incorrect if the received $N_A$ is not equal to the $N_A$ sent to the device A;

checking whether the received $N_B$ is equal to the $N_B$ sent to the device A, authenticating the fifth combination of fields as incorrect if the received $N_B$ is not equal to the $N_B$ sent to the device A;

decrypting the AuthEncData$_A$ by using a decryption authentication algorithm AuthDec$_{KEIA}$ that is derived from the KEIA, to obtain the $N_A$, the $N_B$, the ID$_A$, the ID$_B$, the ZSEED$_A$ and the MAC$_A$, wherein $N_A\|N_B\|ID_A\|ID_B\|ZSEED_A\|MAC_A$=AuthDec$_{KEIA}$(AAD,IV,AuthEncData$_A$);

determining whether the obtained MAC$_A$ is equal to the MAC$_A$ in the received AuthEncData$_A$, and authenticating the fifth combination of fields as incorrect if the obtained MAC$_A$ is not equal to the received MAC$_A$;

checking whether the ID$_A$ and the ID$_B$ obtained by decryption are same as the identifiers of the device A and the device B, and authenticating the fifth combination of fields as incorrect if the obtained ID$_A$ and ID$_B$ are not same as the identifiers of the device A and the device B; and checking whether the $N_A$ and the $N_B$ obtained by decryption are equal to the $N_A$ and the $N_B$ sent to the device A, and authenticating the fifth combination of fields as incorrect if the obtained $N_A$ and $N_B$ are not equal to the $N_A$ and the $N_B$ sent to the device A.

6. The method according to claim 5, wherein $N_A$ sent from the device A to the device B is transmitted after being encapsulated in an ACT_REQ protocol data unit, $N_B\|N_A\|$AuthEncData$_B$ sent from the device B to the device A is transmitted after being encapsulated in an ACT_RES protocol data unit, $_A\|N_B\|$AuthEncData$_A\|$MacTag$_A$ sent from the device A to the device B is transmitted after being encapsulated in a VFY_REQ protocol data unit, and MacTag$_B$ sent from the device B to the device A is transmitted after being encapsulated in a VFY_RES protocol data unit, where ACT_REQ, ACT_RES, VFY_REQ and VFY_RES are protocol data unit formats conforming to definitions of the Standard ISO/IEC 13157-1.

7. The method according to claim 2, wherein $N_A$ sent from the device A to the device B is transmitted after being encapsulated in an ACT_REQ protocol data unit, $N_B\|N_A\|$AuthEncData$_B$ sent from the device B to the device A is transmitted after being encapsulated in an ACT_RES protocol data unit, $N_A\|N_B\|$AuthEncData$_A\|$MacTag$_A$ sent from the device A to the device B is transmitted after being encapsulated in a VFY_REQ protocol data unit, and MacTag$_B$ sent from the device B to the device A is transmitted after being encapsulated in a VFY_RES protocol data unit, where ACT_REQ, ACT_RES, VFY_REQ and VFY_RES are protocol data unit formats conforming to definitions of the Standard ISO/IEC 13157-1.

8. The method according to claim 1, wherein the AAD for encrypting the first encryption authentication data AuthEncData$_B$ in step 2) and encrypting to acquire the second encryption authentication data AuthEncData$_A$ in step 4) comprises protocol parameters and is set as AAD=SEP$\|$PID, where SEP is a security protocol parameter, PID is a protocol identifier, and SEP and PID conform to definitions of the Standard ISO/IEC 13157-1;

the IV for encrypting the first encryption authentication data AuthEncData$_B$ in step 2) is generated by the key derivation algorithm and is set as a low 96-bit value of a calculation result of KDF3(MKA,KEIA,$N_A$,$N_B$); and the IV for encrypting the second encryption authentication data AuthEncData$_A$ in step 4) is generated by the key derivation algorithm and is set as a high 96-bit value of a calculation result of KDF3(MKA,KEIA,$N_A$,$N_B$), where KDF3 is a key derivation algorithm.

9. The method according to claim 8, wherein $N_A$ sent from the device A to the device B is transmitted after being encapsulated in an ACT_REQ protocol data unit, $N_B\|N_A\|$AuthEncData$_B$ sent from the device B to the device A is transmitted after being encapsulated in an ACT_RES protocol data unit, $N_A\|N_B\|$AuthEncData$_A\|$MacTag$_A$ sent from the device A to the device B is transmitted after being encapsulated in a VFY_REQ protocol data unit, and MacTag$_B$ sent from the device B to the device A is transmitted after being encapsulated in a VFY_RES protocol data unit, where ACT_REQ, ACT_RES, VFY_REQ and VFY_RES are protocol data unit formats conforming to definitions of the Standard ISO/IEC 13157-1.

10. The method according to claim 1, wherein $N_A$ sent from the device A to the device B is transmitted after being encapsulated in an ACT_REQ protocol data unit, $N_B\|N_A\|$AuthEncData$_B$sent from the device B to the device A is transmitted after being encapsulated in an ACT_RES protocol data unit, $N_A\|,N_B\|$AuthEncData$_A\|$MacTag$_A$ sent from the device A to the device B is transmitted after being encapsulated in a VFY_REQ protocol data unit, and MacTag$_B$ sent from the device B to the device A is transmitted after being encapsulated in a VFY_RES protocol data unit, where ACT_REQ, ACT_RES, VFY_REQ and VFY_RES are protocol data unit formats conforming to definitions of the Standard ISO/IEC 13157-1.

11. A device for performing identity authentication with another device, comprising a storing unit;

a processing unit; and a transceiver unit, wherein the storing unit is configured to store a pre-shared key PSK with the another device and an identifiers ID$_B$ of the another device;

the transceiver unit is configured to send a random number $N_A$ to the another device and receive a first combination of fields sent by the another device;

the transceiver unit is further configured to send a second combination of fields to the another device and receive a second message authentication identifier MacTag$_B$ sent by the another device;

the processing unit is configured to generate the random number $NA_A$;

the processing unit is further configured to perform decryption and verification on the first combination of fields sent by the another device, and acquire a random number ZSEED$_B$ functioning as a key seed generated by the another device;

the processing unit is further configured to generate a random number ZSEED$_A$ functioning as another key seed, derive an authentication key MKA and a message encryption-and-integrity key KEIA by using a first key derivation algorithm KDF1, encrypt an other authentication data AAD, an initial vector IV, and a third combination of fields by using an encryption authentication algorithm $AuthEnc_{KEIA}$ derived based on the KEIA to acquire second encryption authentication data $AuthEncData_A$ calculate a shared key seed Z by an exclusive-OR between the $ZSEED_A$ and $ZSEED_B$, derive a master key MK based on the $N_A$, the $N_B$, an identifier $ID_A$ of the device, the $ID_B$, and the Z by using a second key derivation algorithm KDF2, generate a fourth combination of fields by using a massage authentication code generation algorithm MAC and the MK to calculate a first message authentication identifier $MacTag_A$, and generate the second combination of fields; and the processing unit is further configured to generate a fifth combination of fields by using the MAC and the MK to calculate a second message authentication identifier $MacTag_B$, compare the calculated $MacTag_B$ with another $MacTag_B$ sent by the another device, and determine that an identity of the another device is valid if the calculated $MacTag_B$ is equal to the $MacTag_B$ sent by the another device;

wherein the first combination of fields comprises $N_B\|N_A\|AuthEncData_B$, the second combination of fields comprises $N_A\|N_B\|AuthEncData_A\|MacTag_A$, the third combination of fields comprises $N_A\|N_B\|ID_A\|ID_B\|ZSEED_A$, the fourth combination of fields comprises $MsgID1\|ID_A\|ID_B\|N_A\|N_B$, the fifth combination of fields comprises $MsgID2\|ID_B\|ID_A\|N_B\|N_A$, $AuthEncData_B$ is first encryption authentication data generated by the another device, MsgID1 is a message serial number, and MsgID2 is another message serial number;

wherein $MKA\|KEIA=KDF1(N_A,N_B,PSK,ID_A,ID_B)$, $AuthEncData_A=AuthEnc_{KEIA}(AAD, IV, N_A\|N_B\|ID_A\|ID_B\|ZSEED_A)$, $Z=ZSEED_A \oplus ZSEED_B$, $MK=KDF2(N_A,N_B,Z,ID_A,ID_B)$, $MacTag_A=MAC(MK, MsgID1\|ID_A\|ID_B\|N_A\|N_B)$, and $MacTag_B=MAC(MK, MsgID2\|ID_B\|ID_A\|N_B\|N_A)$; and wherein $\|$ represents an operation of combining fields.

12. The device according to claim 11, wherein the $AuthEncData_B$ comprises $EncData_B\|MAC_B$, $EncData_B$ is encryption data generated by the another device, and $MAC_B$ is an integrity authentication code generated by the another device, and for performing decryption authentication on the first combination of fields sent by the another device, the processing unit is further configured to:

check whether the received $N_A$ is equal to the $N_A$ sent to the another device, and authenticate the first combination of fields as incorrect if the received $N_A$ is not equal to the $N_A$ sent to the another device;

decrypt the $AuthEncData_B$ by using a decryption authentication algorithm $AuthDec_{KEIA}$ that is derived from the KEIA, to obtain the $N_A$, the $N_B$, the $ID_A$, the $ID_B$, the $ZSEED_B$ and the $MAC_B$, wherein $N_A\|N_B\|ID_A\|ID_B\|ZSEED_B\|MAC_B=AuthDec_{KEIA}(AAD,IV,AuthEncData_B)$;

determine whether the obtained $MAC_B$ is equal to the $MAC_B$ in the received $AuthEncData_B$, and authenticate the first combination of fields as incorrect if the obtained $MAC_B$ is not equal to the received $MAC_B$;

check whether the $ID_A$ and the $ID_B$ obtained by decryption are same as the identifiers of the device and the another device, and authenticate the first combination of fields as incorrect if the obtained $ID_A$ and $ID_B$ are not same as the identifiers of the device and the another device;

check whether the $N_A$ obtained by decryption is equal to the $N_A$ sent to the another device, authenticate the first combination of fields as incorrect if the obtained $N_A$ is not equal to the $N_A$ sent to the another device; and check whether the $N_B$ obtained by decryption is equal to the $N_B$ in the received first combination of fields, and authenticate the first combination of fields as incorrect if the obtained $N_B$ is not equal to the received $N_B$.

13. A device for performing identity authentication with another device, the device comprising a storing unit, a processing unit and a transceiver unit, wherein the storing unit is configured to store a pre-shared key PSK with the another device and an identifiers $ID_A$ of the another device;

the transceiver unit is configured to receive a random number $N_A$ sent by the another device;

the transceiver unit is further configured to send a first combination of fields to the another device and receive a second combination of fields sent by the another device;

the transceiver unit is further configured to send a second message authentication identifier $MacTag_B$ to the another device;

the processing unit is configured to generate a random number $ZSEED_B$ functioning as a key seed and generate a random number $N_B$, derive an authentication key MKA and a message encryption-and-integrity key KEIA by using a first key derivation algorithm KDF1 encrypt an other authentication data AAD, an initial vector IV and a third combination of fields by using an encryption authentication algorithm $AuthEnc_{KEIA}$ derived based on the KEIA to acquire first encryption authentication data $AuthEncData_B$, and generate the first combination of fields;

the processing unit is further configured to perform decryption and verification on the second combination of fields sent by the another device and acquire a random number $ZSEED_A$ functioning as another key seed generated by the another device; and the processing unit is further configured to calculate a shared key seed Z by an exclusive-OR between the $ZSEED_A$ and $ZSEED_B$, derive a master key MK based on the $N_A$, the $N_B$, an identifier $ID_B$ of the device, the $ID_A$, and the Z by using a second key derivation algorithm KDF2, generate a fourth combination of fields by using a massage authentication code generation algorithm MAC and the MK to calculate a first message authentication identifier $MacTag_A$, compare the calculated $MacTag_A$ with another $MacTag_A$ comprised in the received second combination of fields, stop authentication if the calculated $MacTag_A$ is not equal to the received $MacTag_A$, and determine that the identity of the another device is valid and generate a fifth combination of fields by using the MAC and the MK to calculate a second message authentication identifier $MacTag_B$ if the calculated $MacTag_A$ is equal to the received $MacTag_A$;

wherein the first combination of fields comprises $N_B\|N_A\|AuthEncData_B$, the second combination of fields comprises $N_A\|N_B\|AuthEncData_A\|MacTag_A$, the third combination of fields comprises $N_B\|N_A\|ID_B\|ID_A\|ZSEED_B$, the fourth combination of fields comprises $MsgID1\|ID_A\|ID_B\|N_A\|N_B$, the fifth combination of fields comprises $MsgID2\|ID_B\|ID_A\|N_B\|N_A$, $AuthEncData_A$ is second encryption authentication data generated by the another device, MsgID1 is a message serial number, and MsgID2 is another message serial number;

wherein MKA∥KEIA=KDF1($N_A,N_B$,PSK,$ID_A,ID_B$), AuthEncData$_B$=AuthEnc$_{KEIA}$(AAD, IV, $N_B$∥$N_A$∥$ID_B$∥$ID_A$∥ZSEED$_A$⊕Z=ZSEED$_B$, MK=KDF2 ($N_A,N_B$,Z,$ID_A,ID_B$), MacTag$_A$=MAC(MK, MsgID1∥$ID_A$∥$ID_B$∥$N_A$∥$N_B$), and MacTag$_B$=MAC(MK, MsgID2∥$ID_B$∥$ID_A$∥$N_B$∥$N_A$); and wherein ∥ represents an operation of combining fields.

14. The device according to claim 13, wherein the second encryption authentication data AuthEncData$_A$ comprises EncData$_A$∥MAC$_A$, EncData$_A$ is encryption data generated by the another device, and MAC$_A$ is an integrity authentication code generated by the another device, and for performing decryption and verification on the second combination of fields sent by the another device, the processing unit is further configured to:

check whether the received $N_A$ is equal to the $N_A$ sent to the another device, and authenticate the second combination of fields as incorrect if the received $N_A$ is not equal to the $N_A$ sent to the another device;

check whether the received $N_B$ is equal to the $N_B$ sent to the another device, and authenticate the second combination of fields as incorrect if the received $N_B$ is not equal to the $N_B$ sent to the another device;

decrypt the AuthEncData$_A$ by using a decryption authentication algorithm AuthDec$_{KEIA}$ that is derived from the KEIA, to obtain the $N_A$, the $N_B$, the $ID_A$, the $ID_B$, the ZSEED$_A$ and the MAC$_A$, wherein $N_A$∥$N_B$∥$ID_A$∥$ID_B$∥ZSEED$_A$∥MAC$_A$=AuthDec$_{KEIA}$(AAD,IV,AuthEncData$_A$);

determine whether the obtained MAC$_A$ is equal to the MAC$_A$ in the received AuthEncData$_A$, and authenticate the second combination of fields as incorrect if the obtained MAC$_A$ is not equal to the received MAC$_A$;

check whether the $ID_A$ and the $ID_B$ obtained by decryption are same as the identifiers of the another device and the device, and authenticate the second combination of fields as incorrect if the obtained $ID_A$ and $ID_B$ are not same as the identifiers of the another device and the device; and check whether the $N_A$ and the $N_B$ obtained by decryption are equal to the $N_A$ and the $N_B$ sent to the another device, and authenticate the second combination of fields as incorrect if the obtained $N_A$ and $N_B$ are not equal to the $N_A$ and the $N_B$ sent to the another device.

15. An operation method for an device A for performing identity authentication between the device A and an device B, the device A having a pre-shared key PSK with the device B and knowing an identifier $ID_B$ of the device B, wherein the method comprises:

generating a random number $N_A$ and sending the random number $N_A$ to the device B;

deriving an authentication key MKA and a message encryption-and-integrity key KEIA by using a first key derivation algorithm KDF1;

performing, after receiving a first combination of fields sent by the device B, decryption and verification on the first combination of fields to acquire a random number ZSEED$_B$ functioning as a key seed generated by the device B;

generating a random number ZSEED$_A$ functioning as a key seed;

encrypting an other authentication data AAD, an initial vector IV, and a second combination of fields by using an encryption authentication algorithm AuthEnc$_{KEIA}$ derived based on the KEIA, to acquire second encryption authentication data AuthEncData$_A$;

calculating a shared key seed Z by an exclusive-OR between the ZSEED$_A$ and ZSEED$_B$;

calculating a master key MK based on the $N_A$, the $N_B$, an identifier $ID_A$ of the device A, the $ID_B$, and the Z, wherein the MK is derived by using a second key derivation algorithm KDF2;

generating a third combination of fields by using a massage authentication code generation algorithm MAC and the MK, to calculate a first message authentication identifier MacTag$_A$ sending a fourth combination of fields to the device B;

generating a fifth combination of fields by using the MAC and the MK to calculate a second message authentication identifier MacTag$_B$; and after receiving another second message authentication identifier MacTag$_B$ sent by the device B, comparing the calculated MacTag$_B$ with the received MacTag$_B$; and determining that an identity of the device B is valid if the calculated MacTag$_B$ is equal to the received MacTag$_B$;

wherein the first combination of fields comprises $N_B$∥$N_A$∥AuthEncData$_B$, the second combination of fields comprises $N_A$∥$N_B$∥$ID_A$∥$ID_B$∥ZSEED$_A$, the third combination of fields comprises MsgID1∥$ID_A$∥$ID_B$∥$N_A$∥$N_B$, the fourth combination of fields comprises $N_A$∥$N_B$∥AuthEncData$_A$∥MacTag$_A$, the fifth combination of fields comprises MsgID2∥$ID_B$∥$ID_A$∥$N_B$∥$N_A$, AuthEncData$_B$ is first encryption authentication data generated by the device B, MsgID1 is a message serial number, and MsgID2 is another message serial number;

wherein MKA∥KEIA=KDF1($N_A,N_B$,PSK,$ID_A,ID_B$), AuthEncData$_A$=AuthEnc$_{KEIA}$(AAD, IV, $N_A$∥$N_B$∥$ID_A$∥$ID_B$∥ZSEED$_A$), Z=ZSEED$_A$⊕ZSEED$_B$, MK=KDF2($N_A,N_B$,Z,$ID_A,ID_B$), MacTag$_A$=MAC(MK, MsgID1∥$ID_A$∥$ID_B$∥$N_A$∥$N_B$), and MacTag$_B$=MAC(MK, MsgID2∥$ID_B$∥$ID_A$∥$N_B$∥$N_A$); and wherein ∥ represents an operation of combining fields.

16. The method according to claim 15, wherein the AAD for encrypting the second encryption authentication data AuthEncData$_A$ comprises protocol parameters and is set as AAD=SEP∥PID, where SEP is a security protocol parameter, PID is a protocol identifier, and SEP and PID conform to definitions of the Standard ISO/IEC 13157-1; and the IV for encrypting the second encryption authentication data AuthEncData$_A$ is generated by the key derivation algorithm and is set as a high 96-bit value of a calculation result of KDF3(MKA,KEIA,$N_A,N_B$), where KDF3 is a key derivation algorithm.

17. The method according to claim 15, wherein the AuthEncData$_B$ comprises EncData$_B$∥MAC$_B$, EncData$_B$ is encryption data generated by the another device, and MAC$_B$ is an integrity authentication code generated by the another device, and the performing decryption and verification on the first combination of fields sent by the device B comprises:

checking whether the received $N_A$ is equal to the $N_A$ sent to the device B, and authenticating the first combination of fields as incorrect if the received $N_A$ is not equal to the $N_A$ sent to the device B;

decrypting the AuthEncData$_B$ by using a decryption authentication algorithm AuthDec$_{KEIA}$ that is derived from the KEIA, to obtain the $N_A$, the $N_B$, the $ID_A$, the $ID_B$, the ZSEED$_B$ and the MAC$_B$, wherein $N_A$∥$N_B$∥$ID_A$∥$ID_B$∥ZSEED$_B$∥MAC$_B$=AuthDec$_{KEIA}$(AAD,IV,AuthEncData$_B$);

determining whether the obtained MAC$_B$ is equal to the MAC$_B$ in the received AuthEncData$_B$, and authenticating the first combination of fields as incorrect if the obtained $MAC_B$ is not equal to the received $MAC_B$;

checking whether the $ID_A$ and the $ID_B$ obtained by decryption are same as the identifiers of the device A and the device B, and authenticating the first combination of fields as incorrect if the obtained $ID_A$ and $ID_B$ are not same as the identifiers of the device A and the device B;

checking whether the $N_A$ obtained by decryption is equal to the $N_A$ sent to the device B, authenticating the first combination of fields as incorrect if the obtained $N_A$ is not equal to the $N_A$ sent to the device B; and checking whether the $N_B$ obtained by decryption is equal to the $N_B$ in the received the first combination of fields, and authenticating as the first combination of fields incorrect if the obtained $N_B$ is not equal to the received $N_B$.

18. An operation method for an device B for performing identity authentication between an device A and the device B, the device B having a pre-shared key PSK with the device A and knowing an identifiers $ID_A$ of the device A, wherein the method comprises:

generating, after receiving a random number $N_A$ sent by the device A, a random number $ZSEED_B$ functioning as a key seed and a random number $N_B$;

deriving an authentication key MKA and a message encryption-and-integrity key KEIA by using a first key derivation algorithm KDF1;

encrypting an other authentication data AAD, and an initial vector IV, and a first combination of fields by using an encryption authentication algorithm $AuthEnc_{KEIA}$ derived based on the KEIA, to acquire first encryption authentication data $AuthEncData_B$ sending a second combination of fields to the device A;

performing decryption and verification on a third combination of fields sent by the device A after receiving the third combination sent by the device A, to acquire a random number $ZSEED_A$ functioning as another key seed generated by the device A;

calculating a shared key seed Z by an exclusive-OR between the $ZSEED_A$ and $ZSEED_B$;

deriving a master key MK based on the $N_A$, the $N_B$, an identifier $ID_B$ of the device B, the $ID_A$, and the Z, wherein the MK is calculated by using a second key derivation algorithm KDF2;

generating a fourth combination of fields by using a massage authentication code generation algorithm MAC and the MK, to calculate a first message authentication identifier $MacTag_A$, and after receiving another first message authentication identifier $MacTag_A$ from the device B, comparing the calculated $MacTag_A$ with the received $MacTag_A$, stopping authentication if the calculated $MacTag_A$ is not equal to the received $MacTag_A$;

determining that an identity of the device A is valid, generating a fifth combination of fields by using the MAC and the MK to calculate a second message authentication identifier $MacTag_B$, and sending the $MacTag_B$ to the device A, if the calculated $MacTag_A$ is equal to the received $MacTag_A$;

wherein the first combination of fields comprises $N_B\|N_A\|ID_B\|ID_A\|ZSEED_B$, the second combination of fields comprises $N_B\|N_A\|$, $AuthEncData_B$, the third combination of fields comprises $N_A\|N_B\|AuthEncData_A\|MacTag_A$, the fourth combination of fields comprises $MsgID1\|ID_A\|ID_B\|N_A\|N_B$, the fifth combination of fields comprises $MsgID2\|ID_B\|ID_A\|N_B\|N_A$, $AuthEncData_A$ is second encryption authentication data generated by the another device, MsgID1 is a message serial number, and MsgID2 is another message serial number;

wherein $MKA\|KEIA=KDF1(N_A,N_B,PSK,ID_A,ID_B)$, $AuthEncData_B=AuthEnc_{KEIA}(AAD, IV, N_B\|N_A\|ID_B\|ID_A\|ZSEED_B)$, $Z=ZSEED_A \oplus ZSEED_B$, $MK=KDF2(N_A,N_B,Z,ID_A,ID_B)$, $MacTag_A=MAC(MK, MsgID1\|ID_A\|ID_B\|N_A\|N_B)$, and $MacTag_B=MAC(MK, MsgID2\|ID_B\|ID_A\|N_B\|N_A)$; and wherein $\|$ represents an operation of combining fields.

19. The method according to claim 18, wherein the AAD for encrypting the first encryption authentication data $AuthEncData_B$ comprises protocol parameters and is set as AAD=SEP∥PID, where SEP is a security protocol parameter, PID is a protocol identifier, and SEP and PID conform to definitions of the Standard ISO/IEC 13157-1; and the IV for encrypting the first encryption authentication data $AuthEncData_B$ is generated by the key derivation algorithm and is set as a low 96-bit value of a calculation result of $KDF3(MKA,KEIA,N_A,N_B)$, where KDF3 is a key derivation algorithm.

20. The method according to claim 18, wherein the second encryption authentication data $AuthEncData_A$ comprises $EncData_A\|MAC_A$, $EncData_A$ is encryption data generated by the device A, and $MAC_A$ is an integrity authentication code generated by the device A, and the performing decryption and verification on the third combination of fields sent by the device A comprises:

checking whether the received $N_A$ is equal to the $N_A$ sent to the device A, and authenticating the third combination of fields as incorrect if the received $N_A$ is not equal to the $N_A$ sent to the device A;

checking whether the received $N_B$ is equal to the $N_B$ sent to the device A, authenticating the third combination of fields as incorrect if the received $N_B$ is not equal to the $N_B$ sent to the device A;

decrypting the $AuthEncData_A$ by using a decryption authentication algorithm $AuthDec_{KEIA}$ that is derived from the KEIA, to obtain the $N_A$, the $N_B$, the $ID_A$, the $ID_B$, the $ZSEED_A$ and the $MAC_A$, wherein $N_A\|N_B\|ID_A\|ID_B\|ZSEED_A\|MAC_A=AuthDec_{KEIA}(AAD,IV,AuthEncData_A)$;

determining whether the obtained $MAC_A$ is equal to the $MAC_A$ in the received $AuthEncData_A$, authenticating the third combination of fields as incorrect if the calculated $MAC_A$ is not equal to the received $MAC_A$;

checking the $ID_A$ and the $ID_B$ obtained by decryption are same as the identifiers of the device A and the device B, and authenticating the third combination of fields as incorrect if the obtained $ID_A$ and $ID_B$ are not same as the identifiers of the device A and the device B; and checking whether the $N_A$ and the $N_B$ obtained by decryption are equal to the $N_A$ and the $N_B$ sent to the device A, and authenticating the third combination of fields as incorrect if the obtained $N_A$ and $N_B$ are not equal to the $N_A$ and the $N_B$ sent to the device A.

* * * * *

UNITED STATES PATENT AND TRADEMARK OFFICE
CERTIFICATE OF CORRECTION

PATENT NO. : 10,439,801 B2
APPLICATION NO. : 15/510006
DATED : October 8, 2019
INVENTOR(S) : Yanan Hu et al.

Page 1 of 1

It is certified that error appears in the above-identified patent and that said Letters Patent is hereby corrected as shown below:

In the Claims

At Column 17, Claim 6, Line 44, please replace "$_A||N_B||AuthEncData_A||MacTag_A$" with --$N_A||N_B||AuthEncData_A||MacTag_A$--.

At Column 18, Claim 11, Line 58, please replace "$NA_A$" with --$N_A$--.

At Column 20, Claim 13, Line 28, please replace "KDF1" with --KDF1,--.

At Column 21, Claim 13, Line 3, please replace "$N_B||N_A||ID_B||ID_A||ZSEED_A \oplus Z=ZSEED_B$," with --$N_B||N_A||ID_B||ID_A||ZSEED_B), Z=ZSEED_A \oplus ZSEED_B$--.

Signed and Sealed this
Seventeenth Day of December, 2019

Andrei Iancu
*Director of the United States Patent and Trademark Office*